(12) United States Patent
Shinohara et al.

(10) Patent No.: US 11,376,475 B2
(45) Date of Patent: *Jul. 5, 2022

(54) GOLF BALL

(71) Applicant: Bridgestone Sports Co., Ltd., Tokyo (JP)

(72) Inventors: Hirotaka Shinohara, Chichibu (JP); Takashi Ohira, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,256

(22) Filed: Oct. 16, 2020

(65) Prior Publication Data

US 2021/0077861 A1 Mar. 18, 2021

Related U.S. Application Data

(63) Continuation-in-part of application No. 16/585,389, filed on Sep. 27, 2019, now Pat. No. 10,843,045, (Continued)

(30) Foreign Application Priority Data

Jun. 29, 2017 (JP) .............................. JP2017-127627

(51) Int. Cl.
*A63B 37/00* (2006.01)
*A63B 37/14* (2006.01)
(Continued)

(52) U.S. Cl.
CPC .... *A63B 37/00221* (2020.08); *A63B 37/0022* (2013.01); *A63B 37/0031* (2013.01);
(Continued)

(58) Field of Classification Search
CPC ...... C09D 175/04; C09D 175/06; C09D 5/00; A63B 37/0022; A63B 37/0058; A63B 2102/32
See application file for complete search history.

(56) References Cited

U.S. PATENT DOCUMENTS 4,062,825 A  12/1977  Watabe et al.
5,744,549 A  4/1998  Lutz
(Continued)

FOREIGN PATENT DOCUMENTS

JP  06-114125 A    4/1994
JP  H06-14125   *  4/1994  ......... A63B 37/0022
(Continued)

*Primary Examiner* — John E Simms, Jr.
(74) *Attorney, Agent, or Firm* — Sughrue Mion, PLLC

(57) ABSTRACT

To provide a golf ball that can prevent a decrease in carry distance of a driver shot when it rains and also, can exert excellent spinning performance upon an approach shot. The golf ball of the present invention includes a core, a cover that is provided on an outer side of the core and is provided with dimples, and an outermost layer that is formed on an outer side of the cover and made of a material having a contact angle of 90° or more. The golf ball has a dynamic friction coefficient of 0.52 or more. The material constituting the outermost layer comprises a urethane coating that contains a water repellent additive, and the water repellent additive includes a fluorinated surfactant, silicone-modified acrylate or hydrophobic silica. The urethane coating comprises a polyisocyanate as a curing agent, and the polyisocyanate includes both an adduct form and an isocyanurate form of hexamethylene diisocyanate, and a mixing ratio (isocyanurate form/adduct form) of the isocyanurate and adduct forms of the hexamethylene diisocyanate, expressed as a mass ratio, is from 95/5 to 40/60.

8 Claims, 1 Drawing Sheet

Related U.S. Application Data which is a continuation-in-part of application No. 16/007,115, filed on Jun. 13, 2018, now Pat. No. 10,463,919.

(51) Int. Cl.

| | | |
|---|---|---|
| *C09D 175/04* | (2006.01) | |
| *A63B 102/32* | (2015.01) | |
| *C08L 75/06* | (2006.01) | |

(52) U.S. Cl.
CPC ...... *A63B 37/0033* (2013.01); *A63B 37/0075* (2013.01); *A63B 37/00776* (2020.08); *A63B 2102/32* (2015.10); *A63B 2225/60* (2013.01); *C08L 75/06* (2013.01)

(56) References Cited

U.S. PATENT DOCUMENTS

| | | | | |
|---|---|---|---|---|
| 6,063,859 A | * | 5/2000 | Yamamoto | ......... A63B 37/0003 |
| | | | | 473/351 |
| 6,100,361 A | | 8/2000 | Keller | |
| 10,463,919 B2 | | 11/2019 | Shinohara et al. | |
| 2003/0083158 A1 | * | 5/2003 | Ishino | ................. C09D 175/04 |
| | | | | 473/378 |
| 2004/0142768 A1 | | 7/2004 | Yokota | |
| 2005/0261085 A1 | | 11/2005 | Sasaki | |
| 2007/0213143 A1 | | 9/2007 | Chinn | |
| 2008/0280699 A1 | | 11/2008 | Jarvholm | |
| 2010/0029413 A1 | | 2/2010 | Matroni | |
| 2013/0018907 A1 | | 1/2013 | Kuhn et al. | |
| 2013/0053183 A1 | | 2/2013 | Kennedy, III et al. | |
| 2013/0165271 A1 | | 6/2013 | Lee | |
| 2013/0203524 A1 | * | 8/2013 | Tarao | ................. A63B 37/0022 |
| | | | | 473/378 |
| 2013/0324318 A1 | | 12/2013 | Isogawa | |
| 2015/0273276 A1 | | 10/2015 | Isogawa | |
| 2016/0136484 A1 | | 5/2016 | Inoue | |
| 2016/0184649 A1 | | 6/2016 | Matsuyama | |
| 2017/0056731 A1 | | 3/2017 | Tarao | |
| 2017/0107399 A1 | * | 4/2017 | Suzuki | ............... C08G 18/4277 |
| 2017/0173398 A1 | | 6/2017 | Tachibana | |
| 2017/0340922 A1 | | 11/2017 | Inoue | |
| 2018/0093137 A1 | * | 4/2018 | Park | ................... C08G 18/4252 |
| 2018/0142125 A1 | * | 5/2018 | Shinohara | ................ C09D 5/00 |
| 2019/0153259 A1 | | 5/2019 | Li et al. | |
| 2020/0038712 A1 | * | 2/2020 | Kamino | ............. A63B 37/0022 |
| 2020/0139198 A1 | * | 5/2020 | Horiuchi | ............ A63B 37/0033 |
| 2020/0306592 A1 | * | 10/2020 | Horiuchi | .......... A63B 37/00222 |
| 2020/0306593 A1 | * | 10/2020 | Horiuchi | ............. A63B 37/003 |
| 2020/0338397 A1 | * | 10/2020 | Kamino | ............... C09D 175/04 |

FOREIGN PATENT DOCUMENTS

| | | | | | |
|---|---|---|---|---|---|
| JP | H06-114125 | | * | 4/1994 | ......... A63B 37/0022 |
| JP | 2001-214131 | | * | 8/2001 | ......... A63B 37/0022 |
| JP | 2001-214131 A | | | 8/2001 | |
| JP | 2013-176530 A | | | 9/2013 | |
| JP | 2014-524335 A | | | 9/2014 | |
| JP | 2014-527222 A | | | 10/2014 | |
| JP | 2015-503400 A | | | 2/2015 | |
| JP | 2019-060594 | | * | 3/2019 | ....... A63B 37/00221 |
| JP | 2019-060595 | | * | 3/2019 | ....... A63B 37/00221 |

\* cited by examiner

GOLF BALL

CROSS-REFERENCE TO RELATED APPLICATION

The present application is a continuation in part of U.S. application Ser. No. 16/585,389, filed Sep. 27, 2019, which is a continuation in part of U.S. application Ser. No. 16/007,115, filed Jun. 13, 2018, now U.S. Pat. No. 10,463,919, issued Nov. 5, 2019, which claims priority based on Japanese Patent Application No. 2017-127627, filed Jun. 29, 2017, the contents of all of which are incorporated herein by reference in their entirety.

BACKGROUND OF THE INVENTION

The present invention relates to a golf ball, and more particularly to a golf ball having high water repellency.

Golf is played even when it rains. Compared to sunny conditions, under rainy conditions, the wet surface of a golf ball increases its air resistance. Thus, when a golfer hits a drive, carry distance is decreased. To deal with such a problem, JP H06-114125 A, for example, discloses that the surface of a golf ball is made of a water-repellent material having contact angle of 900 or more such as a fluoride-based polymer or silicone resin.

Also, JP 2001-214131 A discloses that urethane resin containing an organic silicone compound is used as a clear coat for the surface of a golf ball to increase the contact angle of the surface up to 90° or more in order to easily remove dirt on the surface of the golf ball.

JP 2014-527222 A discloses decreasing surface energy in a soft surface coating of a golf ball. As described in [0056]-[0061], if the surface energy is decreased, the friction coefficient of the golf ball is decreased, and the contact angle of the golf ball is increased.

JP 2015-503400 A describes that the surface of the golf ball is partially given water repellency with the contact angle of 90° or more and also partially given hydrophilicity with the contact angle of less than 90°, whereby under wet conditions, water is repelled by the water-repellent portion and attracted to the hydrophobic portion and thus, the surface of the water-repellent portion is kept dry so that friction between a golf club head and the golf ball surface is not lowered. As a result, any adverse effect of the wet condition is prevented.

SUMMARY OF THE INVENTION

As mentioned above, it is said that a golf ball having a hydrophobic surface, i.e., one in which contact angle of 90° or more does not cause significant reduction in, in particular, the carry distance of a driver shot when it rains, but if the contact angle of the golf ball increases, the friction coefficient is lowered, leading to a problem that a satisfactory spin rate cannot be ensured upon an approach shot around the green.

In view of the foregoing problems, an object of the present invention is to provide a golf ball that can prevent a decrease in carry distance of a driver shot when it rains and also, can exert excellent spinning performance in an approach shot.

In order to attain the above object, a golf ball according to the present invention includes a core, a cover that is provided on an outer side of the core and is provided with dimples, and an outermost layer that is formed on an outer side of the cover and made of a material having a contact angle of 90° or more, in which the golf ball has a dynamic friction coefficient of 0.52 or more, the material for the outermost layer comprises a urethane coating that contains a water repellent additive, and the water repellent additive includes a fluorinated surfactant, a silicone-modified acrylate, or hydrophobic silica, the urethane coating comprises a polyisocyanate as a curing agent, and the polyisocyanate includes both an adduct form and an isocyanurate form of hexamethylene diisocyanate, and a mixing ratio (isocyanurate form/adduct form) of the isocyanurate and adduct forms of the hexamethylene diisocyanate, expressed as a mass ratio, is from 95/5 to 40/60.

A mixing ratio (isocyanurate form/adduct form) of the isocyanurate and adduct forms of the hexamethylene diisocyanate, expressed as a mass ratio, may be from 75/25 to 40/60.

The urethane coating may include a polyol and a solvent as a main agent, and the polyol may include a polyester polyol. The polyester polyol may contain two types of polyester polyols (A) and (B) having different weight average molecular weights (Mw), the Mw of the polyester polyol (A) may be 20000-30000, and the Mw of the polyester polyol (B) may be 800-1500. The amount of the polyester polyol (A) may be 20-30 mass % with respect to the total amount of the main agent including the solvent, and that of the polyester polyol (B) may be 2-18 mass % with respect to the total amount of the main agent including the solvent.

The water repellent additive may contain hydrophobic silica fine particles so that the contact angle becomes 1200 or more. The amount of the water repellent additive may be 0.1 to 10 mass % with respect to the total amount of the main agent including the solvent. Additionally, the water repellent additive may comprise a fluorinated surfactant having a perfluoroalkyl group, and an alkyl-group chain length of the perfluoroalkyl group may be 7 or less.

The cover is preferably is preferably formed of a material having hardness of 55 or less in terms of Shore D. A material constituting the cover preferably includes thermosetting polyurethane.

A material constituting the outermost layer preferably includes a urethane coating that contains a water repellent additive. The thickness of the outermost layer is preferably 8-20 μm.

If a material having contact angle of 90° or more is used for an outermost layer, the surface of a golf ball is given water repellency, lowering friction coefficient of the golf ball surface, whereby a carry distance of a driver shot is prevented from decreasing in rainy conditions, but a satisfactory spin rate cannot be obtained upon an approach shot around green. According to the present invention, as a material constituting the outermost layer, a urethane coating that contains a water repellent additive including a fluorinated surfactant, silicone-modified acrylate or hydrophobic silica is used, a polyisocyanate is used as a curing agent of the urethane coating, an adduct form and an isocyanurate form of hexamethylene diisocyanate are used in combination as the polyisocyanate, a mixing ratio (isocyanurate form/adduct form) of the isocyanurate and adduct forms of the hexamethylene diisocyanate, expressed as a mass ratio, is from 95/5 to 40/60, and thus, even if a material having contact angle of 900 or more is used for the outermost layer, a dynamic friction coefficient can be set to 0.52 or more and thus, a satisfactory spin rate can be obtained upon an approach shot.

MODE FOR CARRYING OUT THE INVENTION

An embodiment of the present invention is described below with reference to the accompanying drawings.

Figure 1:
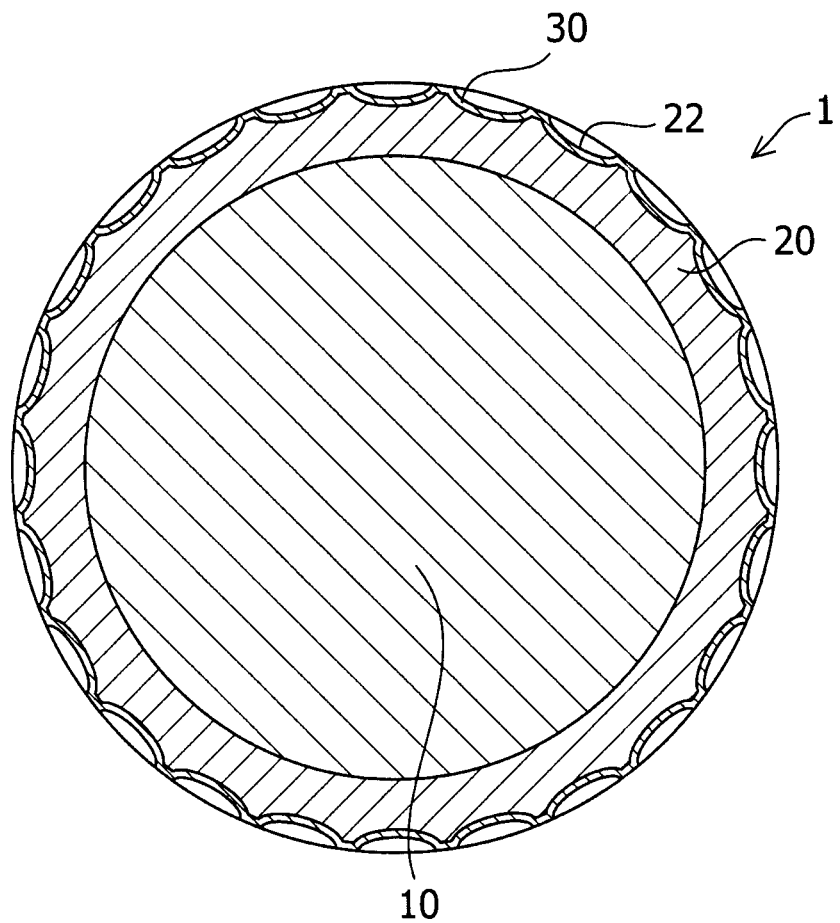
FIG. 1 is a cross-sectional view schematically showing an embodiment of the present invention.

As shown in FIG. 1, a golf ball 1 of this embodiment mainly includes a core 10 at the center of the ball, a cover 20 surrounding the outer periphery of the core 10, and an outermost layer 30 that covers the outside of the cover. The surface of the cover 20 has plural dimples 22. The outermost layer 30 covers the surface of the cover 20 along the surfaces of the dimples 22 with substantially uniform thickness. Here, this embodiment is focused on a golf ball having a two-layer structure with a core and a cover but is not limited thereto and is applicable to a golf ball having an intermediate layer between the core 10 and the cover 20, a golf ball having two or more core layers, or a golf ball with a multilayer structure having three or more layers.

The core 10 can be mainly formed of base rubber. A wide variety of types of rubber (thermosetting elastomer) can be used. Conceivable examples thereof include polybutadiene rubber (BR), styrene butadiene rubber (SBR), natural rubber (NR), polyisoprene rubber (IR), polyurethane rubber (PU), butyl rubber (UR), vinyl polybutadiene rubber (VBR), ethylene propylene rubber (EPDM), nitrile rubber (NBR), and silicone rubber, although the present invention is not limited thereto. As the polybutadiene rubber (BR), for example, 1,2-polybutadiene, cis-1,4-polybutadiene, etc. can be used.

Additionally, to the main component, or the base rubber, the core 10 can optionally contain additives such as a co-crosslinking agent, a crosslinking agent, a filler, an anti-aging agent, an isomerization agent, a peptizer, sulfur, and an organic sulfur compound. Also, as a main component, a thermoplastic elastomer, an ionomer resin, or a mixture thereof may be used instead of the base rubber.

The core 10 has a substantially spherical shape. The outer diameter of the core 10 is preferably about 42 mm or less, more preferably about 41 mm or less, and further preferably about 40 mm or less as the upper limit. The outer diameter of the core 10 is preferably about 5 mm or more, more preferably about 15 mm or more, and most preferably about 25 mm or more as the lower limit. The core 10 is illustrated as a solid core in FIG. 1 but can be a hollow one. Also, the core 10 is illustrated as a single layer in FIG. 1 but is not limited thereto, and may be formed of plural layers such as a center core and its surrounding layers.

Any known molding method is applicable to formation of a core of the golf ball. For example, the following method is conceivable: a material including base rubber is kneaded by a kneader, and then, the kneaded one is subjected to pressure vulcanization molding with a round mold to prepare a core, although it is not limited thereto. Also, any known molding method for a multilayer solid core is applicable to formation of a core with plural layers. For example, the following method is conceivable: a material for a center core is kneaded by a kneader and the kneaded one is subjected to pressure vulcanization molding with a round mold and then, a material for a surrounding layer is kneaded by a kneader and the kneaded one is molded into a sheet and the sheet covers the center core so as to prepare a core with plural layers.

The cover 20 can be obtained by use of thermoplastic polyurethane, an ionomer resin, or a mixture thereof, although it is not limited thereto. In particular, the thermoplastic polyurethane is preferred from the viewpoint of the relationship with the outermost layer 30.

The thermoplastic polyurethane material has a structure composed of a soft segment including polymer polyol (polymeric glycol) and a chain extender and polyisocyanate constituting a hard segment. According to the present invention, the polymer polyol as a raw material is preferably polyester polyol and polyether polyol although not limited thereto. Specific examples of the polyester polyol include an adipate-based polyol such as polyethylene adipate glycol, polypropylene adipate glycol, polybutadiene adipate glycol, polyhexamethylene adipate glycol and lactone-based polyol such as polycaprolactone polyol. Examples of the polyether polyol include poly(ethylene glycol), poly(propylene glycol), poly(tetramethylene glycol) and the like.

As the chain extender, although not particularly limited, the present invention preferably adopts a low molecular weight compound having two or more active hydrogen atoms capable of reacting with isocyanate groups in the molecule and having a molecular weight of 2000 or less. Of these, aliphatic diols having 2 to 12 carbon atoms are preferred. Specific examples thereof include 1,4-butylene glycol, 1,2-ethylene glycol, 1,3-butanediol, 1,6-hexanediol, 2,2-dimethyl-1,3-propanediol. Of these, 1,4-butylene glycol is particularly preferred.

As the polyisocyanate compound, although not particularly limited, the present invention can adopt, for example, one or two or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene 1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, and dimer acid diisocyanate. Here, it is difficult to control the crosslinking reaction during injection molding for some kinds of isocyanates. Thus, in the present invention, from the viewpoint of balance between stability during production and physical properties to be expressed, 4,4'-diphenylmethylene diisocyanate as aromatic diisocyanate is preferred.

Although not limited thereto, the ionomer resin can contain (a) component and/or (b) base resin as below, and (c) component as below can be optionally added to the base resin. The (a) component is an olefinically unsaturated carboxylic acid/unsaturated carboxylic acid ester ternary random copolymer and/or a metal salt thereof. The (b) component is an olefin/unsaturated carboxylic acid binary random copolymer and/or a metal salt thereof. The (c) component is a thermoplastic block copolymer having a polyolefin crystal block and a polyethylene/butylene random copolymer.

Additionally, to the above thermoplastic polyurethane or ionomer resin, or the main component, the cover 20 can be mixed with a thermoplastic resin or elastomer other than thermoplastic polyurethane. More specifically, it is possible to use one or more selected from polyester elastomer, polyamide elastomer, an ionomer resin, styrene block elastomer, hydrogenated styrene butadiene rubber, a styrene/ethylene-butylene-ethylene block copolymer or a modified form thereof, an ethylene-ethylene/butylene-ethylene block copolymer or a modified form thereof, styrene/ethylene-butylene/styrene block copolymer or modified forms thereof, ABS resin, polyacetal, polyethylene and nylon resin. It is particularly preferred to adopt polyester elastomer, polyamide elastomer and polyacetal because of resilience and anti-scratch characteristics, etc. are improved through reaction with an isocyanate group while maintaining high productivity. In the case of mixing the above components, the mixing amount can be appropriately selected according to the hardness adjustment of the cover material and improvements in resilience, flowability, adhesion, etc. Although not particularly limited, it can be mixed in 5 parts by mass with respect to 100 parts by mass of thermoplastic polyurethane component. Also, the upper limit of the mixing amount can be preferably 100 parts by mass or less, more preferably 75 parts by mass or less, and still more preferably 50 parts by mass or less with respect to 100 parts by mass of thermoplastic polyurethane component although not particularly limited. In addition, a polyisocyanate compound, a fatty acid or a derivative thereof, a basic inorganic metal compound, a filler, etc. can be added.

Although not so limited, the thickness of the cover 20 is preferably about 0.2 mm or more, more preferably about 0.4 mm or more as the lower limit, and the thickness of the cover 20 is preferably about 4 mm or less as the upper limit, more preferably about 3 mm or less, and still more preferably about 2 mm or less. The surface of the cover 20 has plural dimples 22. The size, shape, and number of dimples 22 can be appropriately set according to desired aerodynamic property.

Although not so limited, the hardness of the cover 20 is preferably about 55 or less, more preferably about 53 or less, and still more preferably about 50 or less in terms of Shore D Hardness as the upper limit and the hardness of the cover 20 is preferably about 38 or more, more preferably about 40 or more, and still more preferably about 43 or more in terms of Shore D Hardness as the lower limit. The hardness of the cover 20 is measured under such conditions that the resin material for the cover layer is molded into a 2 mm-thick sheet and left to stand for two weeks or more and then, the hardness is measured according to ASTM D2240-95.

Any known molding method for a cover of a golf ball can be used for formation of the cover 20. Although not particularly limited, for example, the cover 20 is prepared by injection molding of a cover material in a mold. This mold for molding a cover has a cavity used for molding a cover and the wall surface of the cavity has plural projections for forming dimples. By arranging the core 10 at the center of the cavity, the cover 20 is formed to cover the core 10.

An optional intermediate layer (not shown) may be formed between the core 10 and the cover 20. An intermediate layer having a function of the core or having a function of the cover can be provided. Alternatively, plural intermediate layers can be formed. For example, plural intermediate layers that function as the core or cover can be formed or first and second intermediate layers that function as the core and the cover, respectively, can be formed.

Although not so limited, the outermost layer 30 can be formed using a urethane coating formed from polyol as a main agent, and polyisocyanate as a curing agent. To the main component, added as an additive is a water repellant additive so that a material constituting the outermost layer 30 can have the contact angle of 90° or more. The respective components are described below.

Although not so limited, it is preferable to use polyesterpolyol as polyol, and two types of polyesterpolyols, i.e., (A) polyesterpolyol and (B) polyesterpolyol can be used. In the case of using these two types of polyesterpolyols, they have different weight average molecular weights (Mw); the weight is preferably 20000-30000 for (A) component and 800-1500 for (B) component. The weight average molecular weight (Mw) for (A) component is more preferably 22000-29000 and still more preferably 23000-28000. The weight average molecular weight (Mw) for (B) component is more preferably 900-1200, and still more preferably 1000-1100.

The polyesterpolyol is obtained by polycondensation of polyol and polybasic acid. Conceivable examples of the polyol include diols such as ethylene glycol, 1,2-propanediol, 1,3-propanediol, 1,3-butanediol, 1,4-butanediol, 1,6-hexanediol, neopentyl glycol, diethylene glycol, dipropylene glycol, hexylene glycol, dimethylol heptane, polyethylene glycol and polypropylene glycol, triols, tetraols, and polyols having an alicyclic structure. Conceivable examples of the polybasic acid include aliphatic dicarboxylic acids such as succinic acid, adipic acid, sebacic acid, azelaic acid and dimer acid, aliphatic unsaturated dicarboxylic acids such as fumaric acid, maleic acid, itaconic acid, and citraconic acid, aromatic polyvalent carboxylic acids such as phthalic acid, isophthalic acid, terephthalic acid, trimellitic acid and pyromellitic acid, dicarboxylic acids having an alicyclic structure such as tetrahydrophthalic acid, hexahydrophthalic acid, 1,3-cyclohexanedicarboxylic acid, 1,4-cyclohexanedicarboxylic acid, and endomethylene tetrahydrophthalic acid and tris-2-carboxythyl isocyanurate. In particular, as the polyesterpolyol for (A) component, polyesterpolyol having a cyclic structure introduced into a resin framework can be adopted. Conceivable examples thereof include polyesterpolyol obtained by polycondensation of polyol having an alicyclic structure such as cyclohexane dimethanol, and a polybasic acid, or polycondensation of polyol having an alicyclic structure and diols or polycondensation of triol and a polybasic acid. On the other hand, as the polyesterpolyol for (B) component, polyesterpolyol having a multi-branched structure can be adopted. Conceivable examples thereof include polyesterpolyol having a branched structure like "NIPPOLAN 800" available from Tosoh Corporation.

In the case of using the above polyesterpolyol, the total weight average molecular weight (Mw) of the main agent is preferably 13000-23000, more preferably 15000-22000. Also, the total number average molecular weight (Mn) of the main agent is preferably 1100-2000, more preferably 1300-1850. If these average molecular weights (Mw and Mn) are out of the above range, a wear resistance of the coating film may possibly be decreased. Note that the weight average molecular weight (Mw) and the number average molecular weight (Mn) are values (in terms of polystyrene measured by Gel permeation chromatography (hereinafter abbreviated as GPC) with a differential refractometer. In the case of using the two types of polyesterpolyols as well, the above range applies to the total weights Mw and Mn of the main agent.

Although not particularly limited, the mixing amounts of the two types of polyesterpolyol, or (A) component and (B) component, are preferably such that the mixing amount of (A) component is 20-30 mass % with respect to the total amount of main agent including a solvent and that of (B) component is 2-18 mass % with respect to the total amount of main agent.

Although not particularly limited, the polyisocyanate can be common aromatic, aliphatic, alicyclic or other polyisocyanate. Specific examples thereof include tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate, I-isocyanato 3,3,5-trimethyl-4-isocyanatomethylcyclohexane, etc. They can be used alone or in mixture.

Conceivable examples of a modified form of the hexamethylene diisocyanate include a polyester modified form of hexamethylene diisocyanate, a urethane modified form thereof. Conceivable examples of a derivative of the hexamethylene diisocyanate include a nurate form (isocyanurate form), burette form, and adduct form of hexamethylene diisocyanate (HMDI). The adduct form refers to an adduct of diisocyanate and trimethylolpropane. The nurate form refers to a diisocyanate trimer. In particular, high spin performance can be obtained by using two types of HMDI which are the adduct form having excellent flexibility and the nurate form having relatively toughness. Conceivable examples of the nurate form of HMDI include Coronate 2357 (available from Tosoh Corporation), Sumijour N3300 (available from Sumika Covestrourethane Co., Ltd.), Duranate TPA-100 (available from Asahi Kasei Corporation), Takenate D170N, Takenate D177N (both available from Mitsui Chemicals, Inc.) and Burnock DN-980 (available from DIC, Inc.). Also, conceivable examples of the adduct form of HMDI include Coronate HL (available from Tosoh Corporation), Takenate D160N (available from Mitsui Chemicals, Inc.), Duranate E402-80B, Duranate E405-70B (both available from Asahi Kasei Corporation), and Burnock DN-955, Burnock DN-955S (both available from DIC, Inc.). The mixing ratio of the nurate form to the adduct form (isocyanurate form/adduct form), expressed as a mass ratio, is preferably from 95/5 to 40/60, more preferably from 80/20 to 55/45.

In the urethane coating formed from polyisocyanate and polyol as a main component of the outermost layer 30, a molar ratio (NCO group/OH group) between a hydroxyl group (OH group) of polyol and an isocyanate group (NCO group) of polyisocyanate is preferably 0.6 or more, more preferably 0.65 or more as the lower limit. Also, the molar ratio is preferably 1.5 or less, more preferably, 1.0 or less, and still more preferably 0.9 or less as the upper limit. If the molar ratio is below the above lower limit, in some cases, hydroxyl groups remain unreacted, lowering performance and water repellency as a golf ball coating. On the other hand, if the ratio is above the upper limit, an excessive number of isocyanate groups exist, urea groups (easy to separate) are produced by reaction with moisture, with the result that the performance of the golf ball coating may be lowered.

As a curing catalyst (organic metal compound) that promotes reaction between polyol and polyisocyanate, an amine-based catalyst or organic metal-based catalyst can be used. As the organic metal compound, it is possible to suitably use a metal soap such as aluminum, nickel, zinc, and tin, which is conventionally blended as a curing agent for a two-component curing type urethane coating material.

The polyol as a main agent and the polyisocyanate as a curing agent can be respectively mixed with various types of organic solvents according to coating conditions. Conceivable examples of such an organic solvent include aromatic solvents such as toluene, xylene and ethylbenzene, ester solvents such as ethyl acetate, butyl acetate, propylene glycol methyl ether acetate and propylene glycol methyl ether propionate, ketone-based solvents such as acetone, methyl ethyl ketone, methyl isobutyl ketone, cyclohexanone, ether-based solvents such as diethylene glycol dimethyl ether, diethylene glycol diethyl ether, and dipropylene glycol dimethyl ether, alicyclic hydrocarbon solvents such as cyclohexane, methylcyclohexane and ethylcyclohexane, and petroleum hydrocarbon solvents such as mineral spirits, etc.

Although not so limited, conceivable examples of a water repellent additive include silicone resin, fluorine-based polymer, silicone oil, silicone rubber, fluorinated surfactant, and hydrophobic silica or a combination thereof. Although not limited, conceivable examples of silicone resin include a silicone-modified acrylate. The silicone-modified acrylate is a surface conditioner that incorporates an acrylic structure and a silicone structure in one molecule. Since the polysiloxane chain is attached to the acrylic skeleton, unlike ordinary polyrotaxane-based silicones, it is difficult to slip even if the addition amount is increased, and water repellency can be increased. Conceivable examples of the silicone-modified acrylate include BYK3550 and BYK3700 (both available from BYK-Chemie GmbH). Conceivable examples of the silicone oil include methyl hydrogen silicone oil, dimethyl silicone oil, etc.

The fluorinated surfactant may achieve higher water repellency with a smaller addition amount than a general hydrocarbon surfactant or a silicone-based surfactant. Although not limited, conceivable examples of the fluorinated surfactant include trifluoroethylene and polytetrafluoroethylene, and in particular, the fluorinated surfactant having a perfluoroalkyl group having an alkyl-group chain length of 7 or less is preferred. Conceivable examples of such fluorinated surfactant include S-242, S-243, S-420 and S-421 (all available from AGC Seimi Chemical Co., LTD).

It is preferable to use hydrophobic silica fine particles as the hydrophobic silica, for example, SS-50B (available from Tosoh Corporation). The particle size of the hydrophobic silica fine particles is preferably 0.3 to 10.0 µm, and more preferably 1 to 5.0 µm. The water-repellent performance is inferior if the particle size is too small or too coarse.

It is preferred to mix the water repellent additive into the main agent when in use. A mixing amount of the water repellent additive is determined such that the material constituting the outermost layer 30 can have the contact angle of 90° or more. For example, the amount is preferably 0.05 mass % or more, more preferably 0.1 mass % or more as the lower limit with respect to the total amount of main agent, and is preferably 10 mass % or less, more preferably 5 mass % or less as the upper limit.

The contact angle is preferably 95 or more, more preferably 100° or more, and still more preferably 1100 or more as the lower limit. On the other hand, if the contact angle is too large, adhesion between the outermost layer and the cover is lowered and the outermost layer is likely to have difficulties in adhering to the cover or easily peel off. Thus, the upper limit thereof is preferably 160° or less, more preferably 1500 or less. The contact angle is measured under such conditions that the material is applied into a 15 µm-thick resin sheet and 5 µL of water is allowed to drip on the sheet and then, the angle is measured by a contact angle meter. Note that the contact angle of a golf ball with an outermost layer can be measured. In this case, the water is allowed to drip on an edge portion of the dimple of the golf ball upon measurement, whereby the contact angle can be measured in a similar manner to the above measurement method.

Also, the material for the outermost layer 30 can be optionally mixed with any known coating mixed component. Specifically, appropriate amounts of a thickener, an ultraviolet absorber, a fluorescent whitening agent, a slipping agent, a pigment and the like can be mixed.

Although not particularly limited, the thickness of the outermost layer 30 is preferably 8 µm or more, more preferably 10 µm or more as the lower limit, and is preferably 22 µm or less, more preferably 20 µm or less as the upper limit. Although the outermost layer 30 is illustrated as a single layer in FIG. 1, the present invention is not limited thereto, and two or more layers can be used. For example, the outermost layer may have a two-layer structure: an inner layer close to the cover and an outer layer positioned on the outer side. In this case, the following is conceivable: the inner layer is formed as a clear layer mainly containing a urethane coating with no water repellent additive, and the outer layer is formed as a water repellent layer mainly containing a urethane coating with a water repellent additive. This is especially effective for the case of using for the outermost layer a material having large contact angle (e.g., 1400 or more) as mentioned above.

There is no particular limitation on a method for forming the outermost layer 30 on the surface of the cover 20, and any known method of applying a golf ball coating onto the surface of the cover can be used. In this case, an air gun coating method, an electrostatic coating method, etc. can be used.

Figure 2:
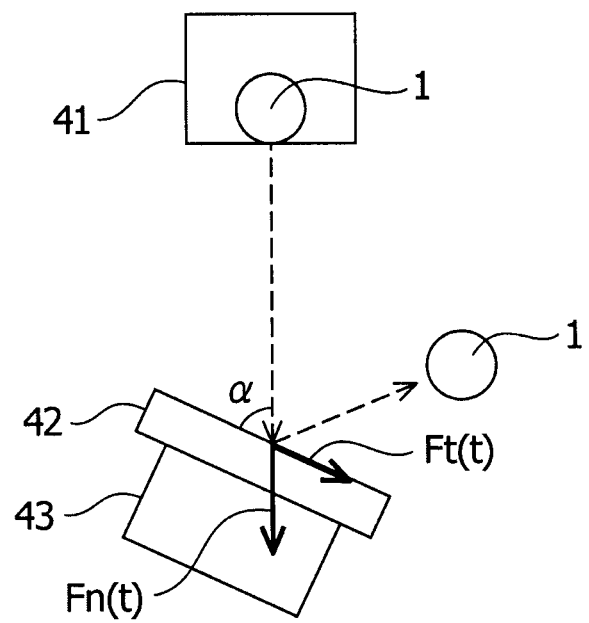
FIG. 2 is a schematic diagram showing a meter of dynamic friction coefficient of a golf ball according to the present invention.

As mentioned above, the golf ball 1 having the outermost layer 30 formed on the surface of the cover 20 preferably has the dynamic friction coefficient of 0.52 or more. As a method of measuring the dynamic friction coefficient, a device substantially the same as a contact angle tester described in JP 2013-176530 A can be used for measurement. In the present invention, as shown in FIG. 2, the golf ball 1 is allowed to fall from an 90 cm-high injection unit 41 and then to collide against a collision plate 42 disposed with an inclination angle α of 20° relative to the falling direction, and a pressure sensor 43 provided at the collision plate 42 measures the dynamic friction coefficient at that time. The angle α of the collision angle is set to 20° so as to simulate a face of an iron club that assumes an open posture upon an approach shot. The dynamic friction coefficient is calculated by:

Dynamic friction coefficient=Contact force in shear direction(Ft(t))/Contact force in falling direction (Fn(t))

The dynamic friction coefficient of the golf ball 1 is preferably 0.53 or more, more preferably 0.54 or more, ad still more preferably 0.55 or more as the lower limit and is preferably 0.60 or less, more preferably 0.59 or less, and still more preferably 0.58 or less as the upper limit. As mentioned above, even if a material having the contact angle of 90° or more is used for the outermost layer 30, as a means for increasing the dynamic friction coefficient of the golf ball 1 up to 0.52 or more, for example, a means for lowering the hardness of the cover 20 to obtain a soft surface or a means for increasing the friction of the outermost layer itself can be used.

The diameter of the golf ball 1 is 42.67 mm (1.68 inches) or more in terms of the lower limit. As the upper limit, it is preferably 44 mm or less, more preferably 43.5 mm or less, and still more preferably 43 mm or less. The weight of the golf ball 1 is 45.93 g (1.620 oz) or less in terms of the upper limit. As the lower limit, it is preferably 44.5 g or more, more preferably 44.7 g or more, and still more preferably 45.2 g or more.

EXAMPLES

The golf balls with the structures of Tables 1 and 2 were prepared and examined of the carry distance and spinning performance. In Tables 1 and 2, the mixing amounts of each component of the main agent and curing agent as materials for the outermost layer are represented by mass % for the main agent and the curing agent. Mixing amounts A-C of the materials for the cover in Tables 1 and 2 are shown in Table 3. Note that the mixing amounts of the respective components in Table 3 are represented by parts by mass.

TABLE 1

|  |  | Comparative Examples | | | | |
|---|---|---|---|---|---|---|
|  |  | 1 | 2 | 3 | 4 | 5 |
| Main agent | Polyol | 28.13 | 29.84 | 27.83 | 28.13 | 29.61 |
|  | Additive | 1.46 | — | 1.95 | 1.46 | 0.23 |
|  | Type | a | — | c | a | b |
|  | Solvent | 70.41 | 70.16 | 70.22 | 70.41 | 70.16 |
| Curing agent | Isocyanate | 42 | 42 | 42 | 42 | 42 |
|  | Nurate form | 100 | 100 | 100 | 100 | 100 |
|  | Adduct form | — | — | — | — | — |
|  | Solvent | 58 | 58 | 58 | 58 | 58 |
| Contact angle |  | 100 | 70 | 100 | 100 | 80 |
| Cover | Mixing amount | A | A | C | C | C |
|  | Hardness | D43 | D43 | D56 | D56 | D56 |
| Dynamic friction coefficient |  | 0.50 | 0.54 | 0.48 | 0.47 | 0.42 |
| Carry distance under rainy conditions |  | −5.5 m | −8.2 m | −5.0 m | −5.5 m | −8.2 m |
|  | Result | Good | Bad | Very good | Good | Bad |
| HS 20 m/s spin rate |  | 3200 | 3696 | 2950 | 2800 | 2850 |
|  | Result | Poor | Very good | Bad | Bad | Bad |

TABLE 2

|  |  | Examples | | | | | | |
|---|---|---|---|---|---|---|---|---|
|  |  | 1 | 2 | 3 | 4 | 5 | 6 | 7 |
| Main agent | Polyol | 27.5 | 27.5 | 27.5 | 27.5 | 27.5 | 27.5 | 27.5 |
|  | Additive | 1.95 | 1.95 | 1.95 | 1.95 | 1.95 | 1.95 | 1.95 |
|  | Type | c | c | c | a | d | a | a |
|  | Solvent | 72.5 | 72.5 | 72.5 | 72.5 | 72.5 | 72.5 | 72.5 |
| Curing agent | Isocyanate | 46.75 | 51.5 | 61 | 51.5 | 51.5 | 55 | 61 |
|  | Nurate form | 90 | 75 | 50 | 75 | 75 | 60 | 50 |
|  | Adduct form | 10 | 25 | 50 | 25 | 25 | 40 | 50 |
|  | Solvent | 54.25 | 48.5 | 39 | 48.5 | 48.5 | 45 | 39 |

TABLE 2-continued

| | Examples | | | | | | |
|---|---|---|---|---|---|---|---|
| | 1 | 2 | 3 | 4 | 5 | 6 | 7 |
| Contact angle | 100 | 100 | 100 | 110 | 150 | 110 | 110 |
| Cover Mixing amount | A | A | A | A | A | A | A |
| Hardness | D43 | D43 | D43 | D43 | D43 | D43 | D43 |
| Dynamic friction coefficient | 0.53 | 0.55 | 0.57 | 0.52 | 0.53 | 0.53 | 0.55 |
| Carry distance under rainy conditions | −5.0 m | −5.0 m | −5.0 m | −5.5 m | −3.0 m | −5.5 m | −5.5 m |
| Result | Very good | Very good | Very good | Good | Extremely good | Good | Good |
| HS 20 m/s spin rate | 3700 | 3900 | 4100 | 3500 | 3700 | 3670 | 3950 |
| Result | Very good | Very good | Very good | Good | Very good | Good | Very good |

As the polyol as the main component for Examples 1-7 and Comparative Examples 1-4 in Tables 1 and 2, polyesterpolyol synthesized by the following method was used. To a reaction apparatus equipped with are flux condenser, a dropping funnel, a gas inlet tube and a thermometer, charged were 140 parts by mass of trimethylolpropane, 95 parts by mass of ethylene glycol, 157 parts by mass of adipic acid, and 58 parts by mass of 1,4-cyclohexanedimethanol, followed by stirring while heating up to 200-240° C. so that the resultant was heated (to react) for 5 hours. After that, polyesterpolyol having an acid value of 4, a hydroxyl value of 170, and a weight average molecular weight (Mw) of 28000 was obtained. Also, the polyol as the main agent of Example 4, 25 parts by mass of the above-mentioned polyester polyol as (A) component and 8 parts by mass of polyester polyol having the trade name "NIPPOLAN 800" (100% of solid content) manufactured by Tosoh Corporation as (B) component were mixed in an organic solvent and were used as the main agent 25. This mixture had a non-volatile content of 30.0 mass % (that is, the amount of the polyester polyol as (A) component was 25% based on the total amount of the main agent containing the solvent, and the amount of the polyester polyol as (B) component was 8% based on the total amount of the main agent mentioned above. The ratio of the polyester polyol (A) to the polyester polyol (B) was about 3:1).

As the additives in Tables 1 and 2, that is, the water repellent additive, a commercially available one can be used, and the types a and b indicate the silicone-based additives. In this case, the type a is a silicone-modified acrylate (trade name: BYK3700 manufactured by BYK-Chemie GmbH), the type b is an organically modified polysiloxane (trade name: BYK370 manufactured by BYK-Chemie GmbH). As the type c, a fluoride-based water repellent agent (which is a fluorinated surfactant having a perfluoroalkyl group with an alkyl-group chain length of 7 or less) was added, and as the type d, hydrophobic silica fine particles (trade name: SS-50B manufactured by Tosoh Corporation) was added.

As the isocyanate of the curing agent in Comparative Examples 1-5 in Table 1, Duranate TPA-100 (NCO content: 23.1%, nonvolatile content: 100%) available from Asahi Kasei Corporation which is a nurate form (isocyanurate form) of hexamethylene diisocyanate (HMDI)) was used. As the isocyanate of the curing agent in Examples 1-7 in Table 2, Duranate E402-80B (NCO content: 7.6%, nonvolatile content: 80%) available from Asahi Kasei Corporation which is the adduct form of hexamethylene diisocyanate (HMDI) together with the nurate form of HMDI, was used. The mixing ratio (mass %) of the nurate form and the adduct form in each example is shown in Table 2. In each example, the solvent was added, and the mixing amount (concentration) of the isocyanate is adjusted to be the values shown in Tables 1 and 2 with respect to the total amount of the curing agent also containing the solvent.

As the solvent of the main agent, butyl acetate was used, ethyl acetate and butyl acetate were used as the solvent of the additive of the curing agent.

The contact angle was measured with a contact angle meter (Model CA-VP, Kyowa Interface Science) by applying a mixture of the main agent and the curing agent to form a resin sheet having a thickness of 15 μm, onto which a 5 μL drop of water was added.

TABLE 3

| | A | C |
|---|---|---|
| T-8290 | 37.5 | |
| T-8283 | 62.5 | |
| Himilan 1557 | | 37.5 |
| Himilan 1601 | | 37.5 |
| Hytrel 4001 | 11 | |
| Nucrel AN 4319 | | 25 |
| Titanium oxide | 3.9 | 3 |
| Polyethylene wax | 1.2 | |
| Isocyanate compound | 7.5 | |
| Magnesium stearate | | 1 |

Regarding the respective components of the cover, the mixing amounts of which are shown in Table 3, the following ones were used.

T-8290, T-8283 are MDI-PTMG type thermoplastic polyurethane elastomers, Pandex (registered trademark) manufactured by DIC Bayer Polymer.

Himilan 1557 is an ionomer resin of a Zn ion-neutralized ethylene-methacrylic acid copolymer manufactured by Mitsui Dupont Polychemical Co., Ltd.

Himilan 1601 is an ionomer resin of Na ion neutralized ethylene-methacrylic acid copolymer manufactured by Mitsui Dupont Polychemical Co., Ltd.

Hytrel 4001 is a thermoplastic polyetherester elastomer manufactured by Du Pont-Toray Co., Ltd.

Nucrel AN 4319 is an ethylene-methacrylic acid copolymer manufactured by Mitsui Dupont Polychemical Co., Ltd.

The titanium oxide is Tipaque R-550 manufactured by Ishihara Sangyo Co., Ltd.

The polyethylene wax is commercially available from Sanyo Chemical Industries, Ltd. under the tradename of Sanwax 161P.

The isocyanate compound is 4,4'-diphenylmethane diisocyanate.

The mixing amounts of the core were the same in all Examples and Comparative Examples: 20 parts by weight of polybutadiene A (trade name: BR 51 manufactured by JSR Corporation) as base rubber, 80 parts by weight of polybutadiene B (trade name: BR 730 manufactured by JSR Corporation), 39.3 parts by weight of zinc acrylate (manufactured by Wako Pure Chemical Industries, Ltd.), 0.6 parts by weight of dicumyl peroxide (trade name: Percumyl D, manufactured by NOF Corporation) as an organic peroxide, 0.1 parts by weight of 2,2-methylene-bis(4-methyl-6-butylphenol) (trade name: Nocrac NS-6, manufactured by Ouchi Shinko Chemical Industrial Co., Ltd.) as an antioxidant, 20.4 parts by weight of zinc oxide (trade name: Tertiary zinc oxide manufactured by Sakai Chemical Industry Co., Ltd.), 1 part by weight of pentachlorothiophenol zinc salt (manufactured by Wako Pure Chemical Industries, Ltd.) as an organic sulfur compound. The vulcanization was carried out under the conditions of a temperature of 155° C. for 15 minutes. The specific gravity of the core was 1.1702, and the actual specific gravity was 1.1462.

The dynamic friction coefficient was measured with the above-mentioned contact force tester shown in FIG. 2. Detailed specifications of the contact force tester will be described. The injection unit 41 was set to allow the ball to fall down from the height of 90 cm. The collision plate 42 was composed of a base plate, a surface layer plate, and a surface layer member. The base plate was made of steel with a size of 80 mm×80 mm×15 mm (thickness), the surface layer plate on the outer side thereof was made of stainless steel (SUS-630) with a size of 80 mm×80 mm×20 mm, and the surface layer member on the outer side thereof was made of titanium alloy with no groove and with an average surface roughness of Ra: 0.146 µm, the maximum height Ry: 1.132 µm, and a size of 80 mm×80 mm×10 mm. The pressure sensor 43 placed on the collision plate 42 was Kissler's three component force sensor (model 9067). A charge amplifier (not shown) was Kissler's amplifier (model 5011B).

The dynamic friction coefficient was measured in the following way.
(a) The inclination angle α of the collision plate 42 was adjusted and fixed to 20°.
(b) The golf ball 1 is allowed to fall down from the injection unit 41.
(c) The pressure sensor 43 measures the contact angle Fn(t) in the falling direction and the contact force Ft(t) in the shearing direction when the golf ball 1 collides with the collision plate 42 by use of the pressure sensor 43 to calculate the maximum value of Ft(t)/Fn(t).

The "carry distance in rainy condition" in Tables 1 and 2 indicates a value obtained by measuring the carry distance of a golf ball hit by a robot for hitting a golf ball, to which a driver (W #1) (trade name: TourStage X-Drive 415 (loft angle: 10.5°), manufactured by Bridgestone Sports) was attached, at a head speed (HS) of 45 m/s, both in rainy and sunny conditions, and then, subtracting the carry distance in the sunny condition from the distance in the rainy condition. The value of more than −3 m was evaluated as extremely good, the value of more than −5 m was evaluated as very good, the value of from −5 m to −8 m was evaluated as good, and the value of less than −8 m was evaluated as bad. Note that the above-mentioned "rainy condition" indicates a rainfall of about 5 mm/h. Also, even in the rainy conditions, a hitting point (impact point at which the club contacts the ball) was set so as to protect the club and the ball from rain to ensure the same hitting conditions under both the sunny and rainy conditions and to measure the difference in carry distance.

The "HS 20 m/s spin rate" in Tables 1 and 2 indicates a value obtained by measuring the spin rate (rpm) of a golf ball just after being hit by a robot for hitting a golf ball, to which a sand wedge (trade name: X-WEDGE H8101 58 degree, manufactured by Bridgestone Sports) was attached, at a head speed of 20 m/s, in rainy conditions by use of an initial condition measuring device. It was evaluated at 3600 rpm or more as very good, evaluated at 3400 rpm or more as good, evaluated at 3200 rpm or more as poor, and evaluated at less than 3200 rpm as bad.

As indicated by Tables 1 and 2, in Examples 1-7 in which the dynamic friction coefficient was set to 0.52 or more even when the material having the contact angle of 900 or more was used for the outermost layer, significant reduction in carry distance of a driver shot could be prevented in rainy conditions and also, a satisfactory spin rate of 3500 rpm or more was ensured upon an approach shot in sunny conditions. In particular, in Examples 1-7, not only the nurate form of HMDI but also the adduct form of HMDI having excellent flexibility was mixed and used as the curing agent so that high friction and higher spin rate were obtained. In Examples 4, 6 and 7, even when silicone-modified acrylate was used as the water repellent additive, the spin rate which is about the same level as that of the fluorinated surfactant was ensured. Also, in Example 5, as a result of using hydrophobic silica as the water repellent additive, the contact angle was remarkably increased, and it was possible to prevent the carry distance of a driver shot from being significantly reduced in rainy conditions.

On the other hand, in Comparative Examples 1 and 4 in which the dynamic friction coefficient of the golf ball was 0.50 or less when the material having the contact angle of 90° or more was used for the outermost layer, significant reduction in carry distance of a driver shot could be prevented in rainy conditions, but a spin rate was 3200 or less upon an approach shot in sunny conditions and thus, a satisfactory spin rate was not ensured.

Also, in Comparative Examples 2 and 5 in which the material having the contact angle of less than 90° was used for the outermost layer, the carry distance of a driver shot was largely decreased to about 8 mm or more.

What is claimed is:
1. A golf ball comprising a core, a cover that is provided on an outer side of the core and is provided with dimples, and an outermost layer that is formed on an outer side of the cover and made of a material having a contact angle of 100° or more, wherein
the golf ball has a dynamic friction coefficient of from 0.52 to 0.60,
the material for the outermost layer comprises a urethane coating that contains a water repellent additive, and the water repellent additive includes a fluorinated surfactant, a silicone-modified acrylate, or hydrophobic silica,
the urethane coating comprises a polyisocyanate as a curing agent, and the polyisocyanate includes both an adduct form and an isocyanurate form of hexamethylene diisocyanate, and
a mixing ratio (isocyanurate form/adduct form) of the isocyanurate and adduct forms of the hexamethylene diisocyanate, expressed as a mass ratio, is from 95/5 to 75/25.
2. The golf ball according to claim 1, wherein the urethane coating includes a polyol and a solvent as a main agent, and the polyol includes a polyester polyol.
3. The golf ball according to claim 2, wherein the polyester polyol contains two types of polyester polyols (A) and (B) having different weight average molecular weights

(Mw), the Mw of the polyester polyol (A) is 20000-30000, and the Mw of the polyester polyol (B) is 800-1500.

4. The golf ball according to claim 3, wherein the amount of the polyester polyol (A) is 20-30 mass % with respect to the total amount of the main agent including the solvent, and that of the polyester polyol (B) is 2-18 mass % with respect to the total amount of the main agent including the solvent.

5. The golf ball according to claim 1, wherein the water repellent additive contains hydrophobic silica fine particles, and the contact angle is 120° or more.

6. The golf ball according to claim 1, wherein the amount of the water repellent additive is 0.1 to 10 mass % with respect to the total amount of the main agent including the solvent.

7. The golf ball according to claim 1, wherein the cover is formed of a material having hardness of 55 or less in terms of Shore D Hardness.

8. The golf ball according to claim 1, wherein the outermost layer has a thickness of 8-20 μm.

\* \* \* \* \*